(12) United States Patent
Vilaipornsawai et al.

(10) Patent No.: US 9,137,074 B2
(45) Date of Patent: Sep. 15, 2015

(54) SYSTEM AND METHOD FOR GUARD BAND UTILIZATION FOR SYNCHRONOUS AND ASYNCHRONOUS COMMUNICATIONS

(71) Applicant: FutureWei Technologies, Inc., Plano, TX (US)

(72) Inventors: Usa Vilaipornsawai, Nepean (CA); Mohammad Javad Abdoli, Kanata (CA); Jianglei Ma, Ottawa (CA); Ming Jia, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/180,147

(22) Filed: Feb. 13, 2014

(65) Prior Publication Data

US 2015/0229502 A1    Aug. 13, 2015

(51) Int. Cl.
*H04L 27/28* (2006.01)
*H04L 27/26* (2006.01)

(52) U.S. Cl.
CPC ........ *H04L 27/2607* (2013.01); *H04L 27/2627* (2013.01)

(58) Field of Classification Search
CPC ... H04L 5/0053; H04L 5/023; H04L 27/2605; H04L 27/2607; H04L 27/2666; H04L 5/04; H04L 5/06
USPC ......................................................... 375/260
See application file for complete search history.

(56) References Cited

U.S. PATENT DOCUMENTS

| | | |
|---|---|---|
| 5,818,827 A | 10/1998 | Usui et al. |
| 2010/0118994 A1* | 5/2010 | Park et al. ............... 375/260 |
| 2011/0207496 A1 | 8/2011 | Cho et al. |
| 2011/0286370 A1 | 11/2011 | Tang et al. |
| 2013/0028346 A1* | 1/2013 | Hottinen ............... 375/285 |
| 2014/0254404 A1* | 9/2014 | Ratnakar ............... 370/252 |

FOREIGN PATENT DOCUMENTS

CN    101778392 A    7/2010

OTHER PUBLICATIONS

Chen, W., et al., "Research on Utilizing Guard Band in LTE Uplink Co-Existence Based on Uncoordinated Deployment Scenario," IET International Conference on Communication Technology and Application, Oct. 14-16, 2011, pp. 441-446.

(Continued)

*Primary Examiner* — Kevin Kim
(74) *Attorney, Agent, or Firm* — Slater & Matsil, L.L.P.

(57) ABSTRACT

Embodiments are provided for guard band utilization for synchronous and asynchronous communications in wireless networks. A user equipment (UE) or a network component transmits symbols on data bands assigned for primary communications. The data bands are separated by a guard band having smaller bandwidth than the data bands. The UE or network component further modulates symbols for secondary communications with a spectrally contained wave form, which has a smaller bandwidth than the guard band. The spectrally contained wave form is achieved with orthogonal frequency-division multiplexing (OFDM) modulation or with joint OFDM and Offset Quadrature Amplitude Modulation (OQAM) modulation. The modulated symbols for the secondary communications are transmitted within the guard band.

20 Claims, 5 Drawing Sheets

(56) References Cited

OTHER PUBLICATIONS

Farhang-Boroujeny, B., et al., "Multicarrier Communication Techniques for Spectrum Sensing and Communication in Cognitive Radios," IEEE Communications Magazine, vol. 46, No. 4, Apr. 2008, pp. 80-85.

Yuan, Z., et al., "On Sidelobe Suppression for Multicarrier-Based Transmission in Dynamic Spectrum Access Networks," IEEE Transactions on Vehicular Technology, vol. 59, No. 4, May 2010, pp. 1998-2006.

International Search Report and Written Opinion received in International Application No. PCT/CN2015/073043 mailed May 4, 2015, 13 pages.

* cited by examiner

SYSTEM AND METHOD FOR GUARD BAND UTILIZATION FOR SYNCHRONOUS AND ASYNCHRONOUS COMMUNICATIONS

TECHNICAL FIELD

The present invention relates to the field of wireless communications, and, in particular embodiments, to a system and method for guard band utilization for synchronous and asynchronous communications.

BACKGROUND

Orthogonal frequency-division multiplexing (OFDM) is a method of encoding digital data on multiple carrier frequencies. The OFDM scheme is currently deployed in broadband multicarrier communications. However, OFDM suffers from high out of band (OOB) radiation due to the use of a square pulse (e.g., a sinc function in frequency domain) on each subcarrier. A guard band can be used to avoid interference between two bands due to OOB radiation. Filtered OFDM (F-OFDM) is a scheme in which a filtering is applied to a sequence of OFDM symbols to reduce OOB radiation. The F-OFDM scheme has benefits of OFDM, e.g., simple equalization, channel estimation, and suitability for multiple-input and multiple-output (MIMO) transmissions. OFDM/Offset Quadrature Amplitude Modulation (OQAM) is a filter bank scheme which uses a time/frequency localized pulse shaping to yield a spectrally contained waveform. This scheme provides a relatively well contained spectrum and is suitable for synchronous/asynchronous communications. In the OFDM scheme, the guard band is not exploited for data transmission, which results in loss of spectral efficiency. There is a need for a scheme that allows opportunistic radio communications and improves spectral efficiency for synchronous/asynchronous communications.

SUMMARY OF THE INVENTION

In accordance with an embodiment of the disclosure, a method increasing band utilization by a network component in a wireless network includes allocating secondary communications to a guard band. The guard band separates data bands assigned for primary communications and has a smaller bandwidth than the data bands. The method further includes modulating, at the network component, symbols for the secondary communications with a spectrally contained wave form. The spectrally contained wave form has a smaller bandwidth than the guard band. The network component transmits the modulated symbols for the secondary communications within the guard band.

In accordance with another embodiment of the disclosure, a network component for increasing band utilization in a wireless network includes at least one processor and a non-transitory computer readable storage medium storing programming for execution by the processor. The programming includes instructions to allocate secondary communications to a guard band. The guard band separates data bands assigned for primary communications and has a smaller bandwidth than the data bands. The programming further configures the network component to modulate symbols for the secondary communications with a spectrally contained wave form. The spectrally contained wave form has a smaller bandwidth than the guard band. The network component is further configured to transmit the modulated symbols for the secondary communications within the guard band.

In accordance with another embodiment of the disclosure, a method increasing band utilization by a network component in a wireless network includes receiving secondary communications within a guard band. The guard band separates data bands assigned for primary communications and has a smaller bandwidth than the data bands. The network component further detecting, in the received secondary communications, symbols modulated according to a spectrally contained wave form. The spectrally contained wave form has a smaller bandwidth than the guard band.

In accordance with yet another embodiment of the disclosure, a network component for increasing band utilization in a wireless network includes at least one processor and a non-transitory computer readable storage medium storing programming for execution by the processor. The programming includes instructions to receive secondary communications within a guard band. The guard band separates data bands assigned for primary communications and has a smaller bandwidth than the data bands. The programming includes further instructions to detect, in the received secondary communications, symbols modulated according to a spectrally contained wave form. The spectrally contained wave form has a smaller bandwidth than the guard band.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiments are provided herein for guard band utilization for synchronous and asynchronous communications. Specifically, spectrally contained waveforms are used for communications in the guard bands, which separate primary data bands of the system to account for OOB radiation. Due to the spectrally contained waveforms, the guard bands can be used for secondary communications, thereby increasing the spectral efficiency of the system. For instance, the primary system can use OFDM or its variant, e.g., discrete Fourier transform-spread OFDM (DFT-S-OFDM) or Filtered OFDM (F-OFDM), for communications in the primary data bands. A primary band is at a center of a primary bandwidth, which also includes two guard bands on the edges of the primary data band. The secondary system can use the spectrally contained waveforms in the guard bands. The primary system provides primary services or data channels for users of the primary system, and the secondary system provides secondary services or data channels to different users. Alternatively, the secondary system can be used in signaling or other applications for the primary system. The primary services or data channels may have higher quality or priority than the secondary services or data channels.

Figure 1:
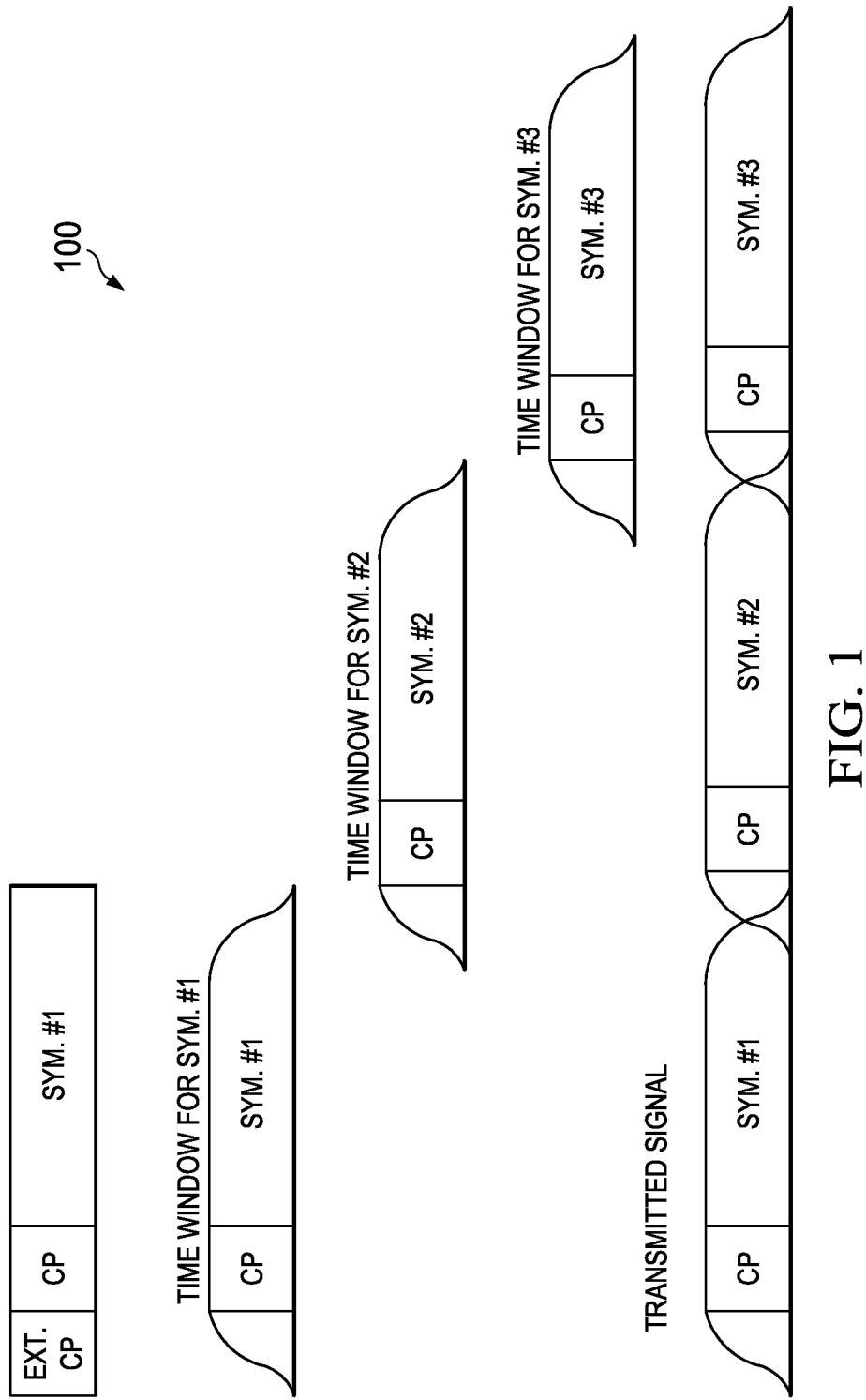
FIG. 1 illustrates an example of a time windowing operation to smooth discontinuity between OFDM symbols.

The spectrally contained waveforms include schemes such as F-OFDM and OFDM/Offset Quadrature Amplitude Modulation (OQAM). For example, the F-OFDM is used for synchronous communications. The OFDM/OQAM is used for synchronous and asynchronous communications. Further, the secondary system are aware of the primary system and the secondary communications using the spectrally contained waveforms in the guard bands can be configured to avoid interference with communications in the primary data bands. FIG. 1 shows an example of a time windowing operation 100 to smooth discontinuity between OFDM symbols. The time windowing (TW) operation 100 is used to smooth the transitions (discontinuity) between consecutive OFDM symbols to prevent a high OOB.

Figure 2:
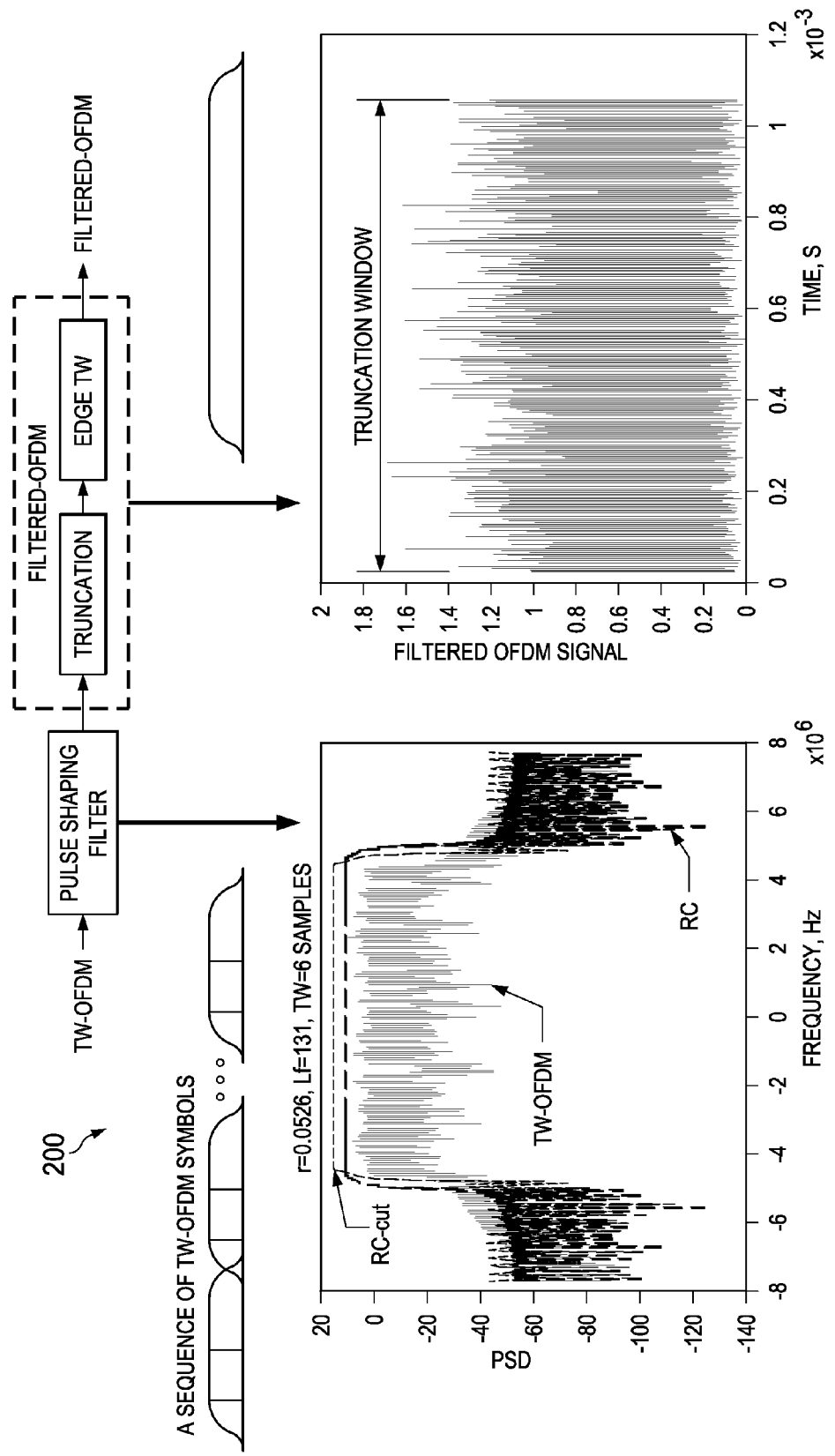
FIG. 2 illustrates an implementation of a filtered time windowing OFDM transmitter system.

FIG. 2 shows one possible implementation of a filtered time windowing OFDM (F-TW-OFDM) transmitter system 200. The F-TW-OFDM is one implementation of the general F-OFDM scheme. The transmitter system can be part of a user equipment (UE) or a base station in a wireless network. As used herein, the term base station refers to any radio access node capable of communicating wireless signals with UEs or other wireless communications devices. For example, a base station may be a NodeB as defined in Universal Mobile Telecommunications Systems (UMTS), or an eNodeB as defined in Long Term Evolution (LTE) systems. In the processing chain in the F-TW-OFDM transmitter system 200, each OFDM symbol is first time-windowed according to the time windowing operation 100. The resulting signal (the sequence of TW-OFDM symbols) is then passed through a pulse shaping filter. However, due to the linear filtering, the filtered signal is expanded in time. In practice, the truncation is performed on the signal to reduce such time expansion (to reduce overhead). However, the truncated signal has abrupt discontinuities at the signal edges, resulting in high OOB. Therefore, another TW process (Edge TW) is needed to smooth out the edges of the truncated signal.

Figure 3:
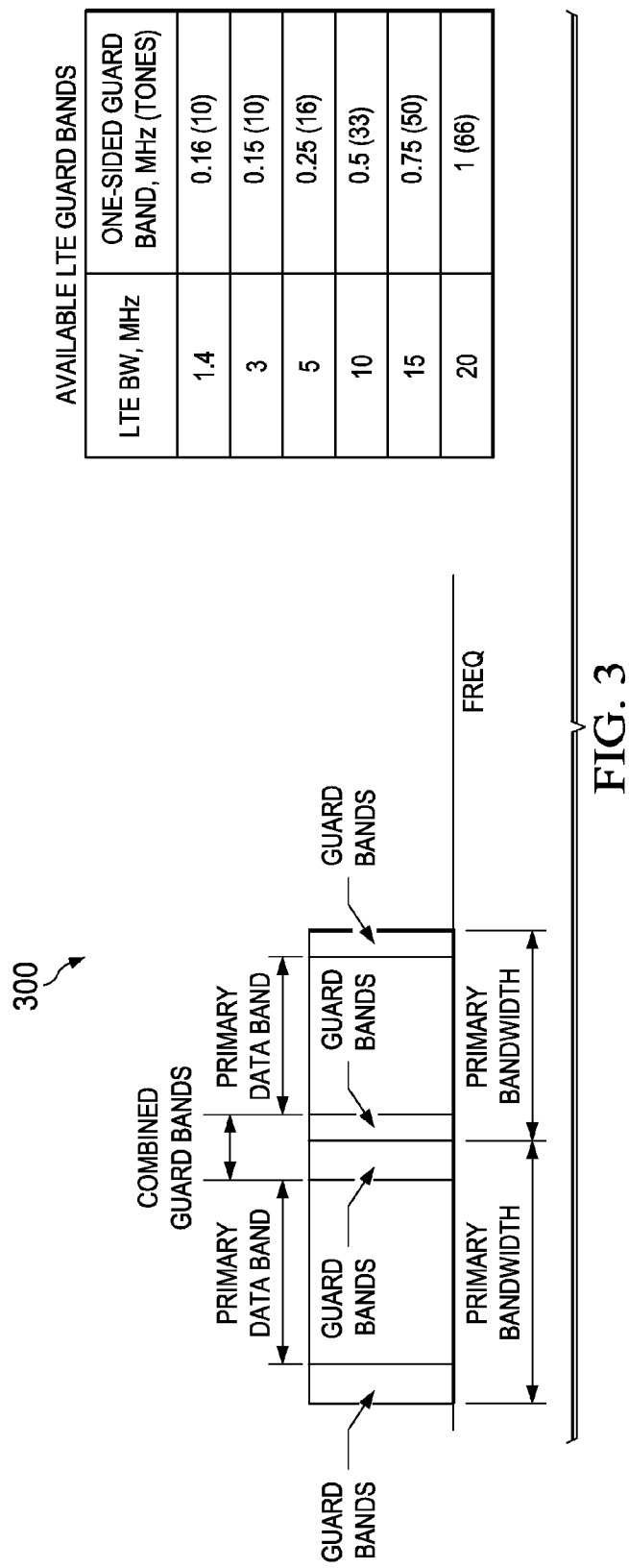
FIG. 3 illustrates an embodiment of a guard band availability scheme.

FIG. 3 shows an embodiment of a guard band availability scheme. In the scheme, multiple primary assigned bandwidths, each including a primary data band surrounded by guard bands. The data bands are used by the primary system, e.g., with OFDM or F-OFDM. The guard bands are used by the secondary system with F-OFDM, OFDM/OQAM or other spectrally contained waveforms. The guard bands on each side of a data band can be used individually as a single band to carry secondary information. Alternatively, two adjacent guard bands belonging to two consecutive data bands can be combined into a single band for the secondary system. Examples of available guard bands in Long Term Evolution (LTE) systems include guard bands with 0.16 MHz on each side of a data band in 1.4 MHz primary bandwidth, and guard bands with 1 MHz on each side of a data band in 20 MHz primary bandwidth. Other examples are shown in FIG. 3.

Figure 4:
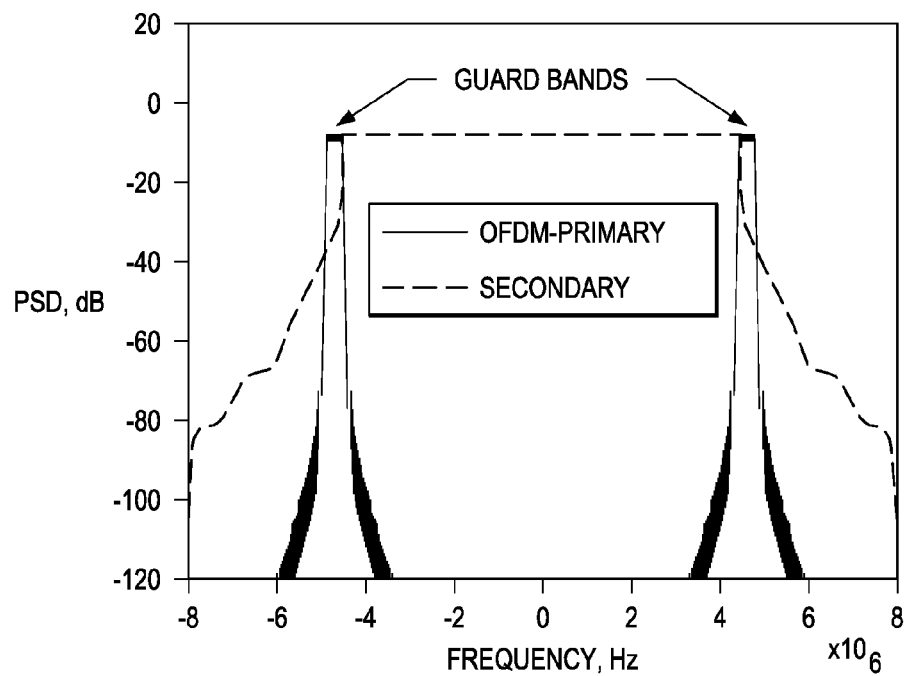
FIG. 4 illustrates an embodiment of a guard band utilization scheme.
Figure 5:
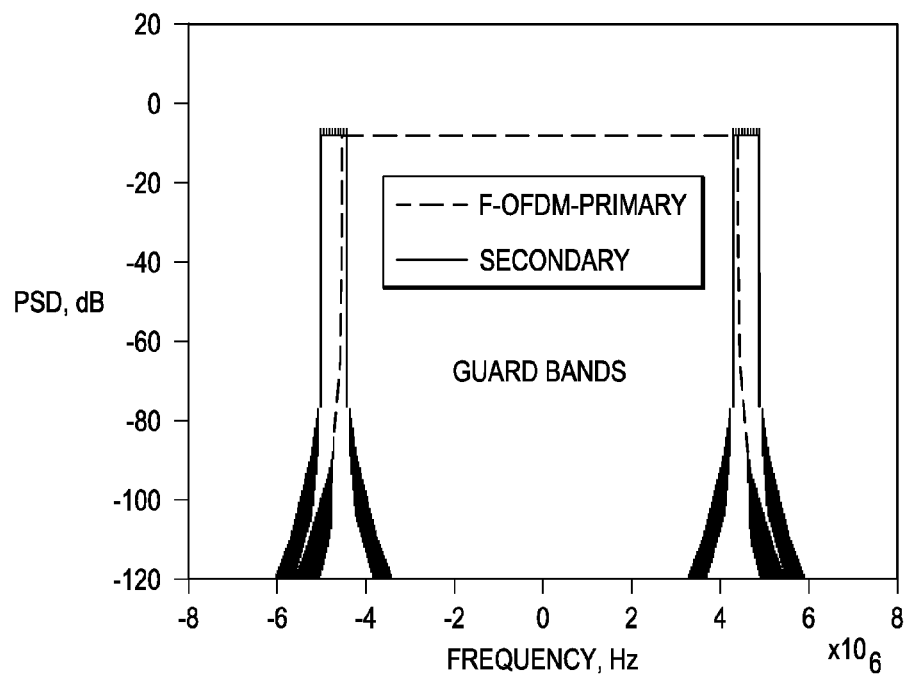
FIG. 5 illustrates another embodiment of a guard band utilization scheme.

FIG. 4 shows an embodiment of a guard band utilization scheme. Specifically, a primary system can use OFDM symbols in the data bands, and a secondary system can use a spectrally contained waveform, such as F-OFDM symbols or OFDM/OQAM symbols, in the guard bands. FIG. 5 shows another embodiment of a guard band utilization scheme. Specifically, a primary system can use F-OFDM symbols in the data bands, and a secondary system can use a spectrally contained waveform, such as F-OFDM symbols or OFDM/OQAM symbols, in the guard bands. In the embodiments above, the OFDM symbols can be F-OFDM symbols. This allows limited OOB radiation to the secondary system. Further, the use of the spectrally contained waveforms in the guard bands allows no or tolerable interference with the OFDM symbols in the data bands. Further, the spectrally contained waveforms, for example using F-OFDM or OFDM/OQAM, have a smaller bandwidth than the guard bands.

In an embodiment, a synchronous secondary system uses F-OFDM symbols in the guard bands. A UE uses synchronization signals from the primary system to synchronize communications for the secondary system. The UE may be a secondary user of the secondary system, or a primary user of the primary system if the secondary system is used in signaling or carrying other information for the primary system The UE can also use its own time-adjustment signals to perform synchronization. Using the synchronization signals of the primary system for the second system reduces overhead, since common signaling is exploited for the two systems. Further, multiple guard bands can be used combined by a single UE or multiple UEs. Alternatively, each guard band can be used by a single UE or multiple UEs. In another embodiment, a synchronous secondary system uses F-OFDM symbols in the guard bands. A UE use dedicated synchronization signals to synchronize communications for the secondary system. This increases overhead since additional synchronization signals are used for the secondary system, but allows more independence between the primary and secondary systems. Further, multiple guard bands can be used combined by a single UE or multiple UEs. Alternatively, each guard band can be used by a single UE or multiple UEs.

Examples of the secondary system include machine-to-machine (M2M) systems, device-to-device (D2D) communications, or other systems that communicate information independent of the primary information of the primary system. In an embodiment, the secondary system communications are transmitted at lower power, such as using pico or femto cell systems, relative to the first system communications. The two communications may serve different purposes. The two communications may have be of the same type (user data) but transmitted at different power levels or have different priority.

In another embodiment, the secondary system uses OFDM/OQAM for both synchronous and asynchronous communications. Multiple guard bands can be used (in combination) by a single UE or multiple UEs. Alternatively, each guard band can be used by a single UE or multiple UEs. Due to the use of well localized pulse shapes in OFDM/OQAM, time asynchronization mainly affects adjacent subcarriers. If a guard band is utilized by multiple UEs in asynchronous mode, then one subcarrier between each pair of adjacent UEs is reserved as a guard in frequency. If a guard band is utilized by a single UE or multiple UEs in synchronous mode, then no reserved subcarriers are required in this guard band. This implementation can have lower OOB radiation in comparison to F-OFDM deployment. However, this OFDM/OQAM deployment can also have higher peak-to-average power ratio (PAPR) in uplink and higher complexity.

Figure 6:
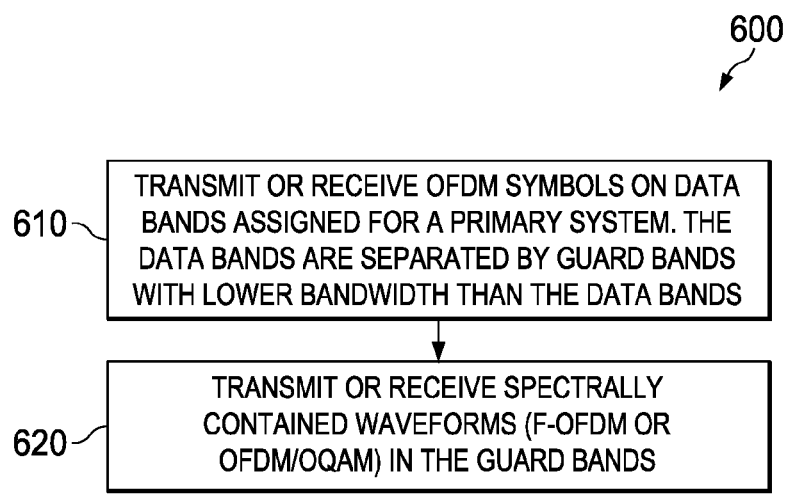
FIG. 6 illustrates an embodiment of a method for guard band utilization for synchronous and/or asynchronous communications.

FIG. 6 shows an embodiment of a method 600 for guard band utilization for synchronous and/or asynchronous communications. The method 600 can be implemented by a UE, a base station or other transmitters in wireless network. At step 610, the network component transmits or receives OFDM symbols within data bands assigned for primary communications. Specifically, the data bands are separated by guard bands, which have smaller bandwidth than the data bands. The OFDM symbols can be F-OFDM symbols. At step 620, the network component transmits or receives, within the guard bands, symbols for secondary communications. The symbols are modulated with a spectrally contained wave form according to OFDM modulation or according to joint OFDM and Offset Quadrature Amplitude Modulation (OQAM) modulation.

Figure 7:
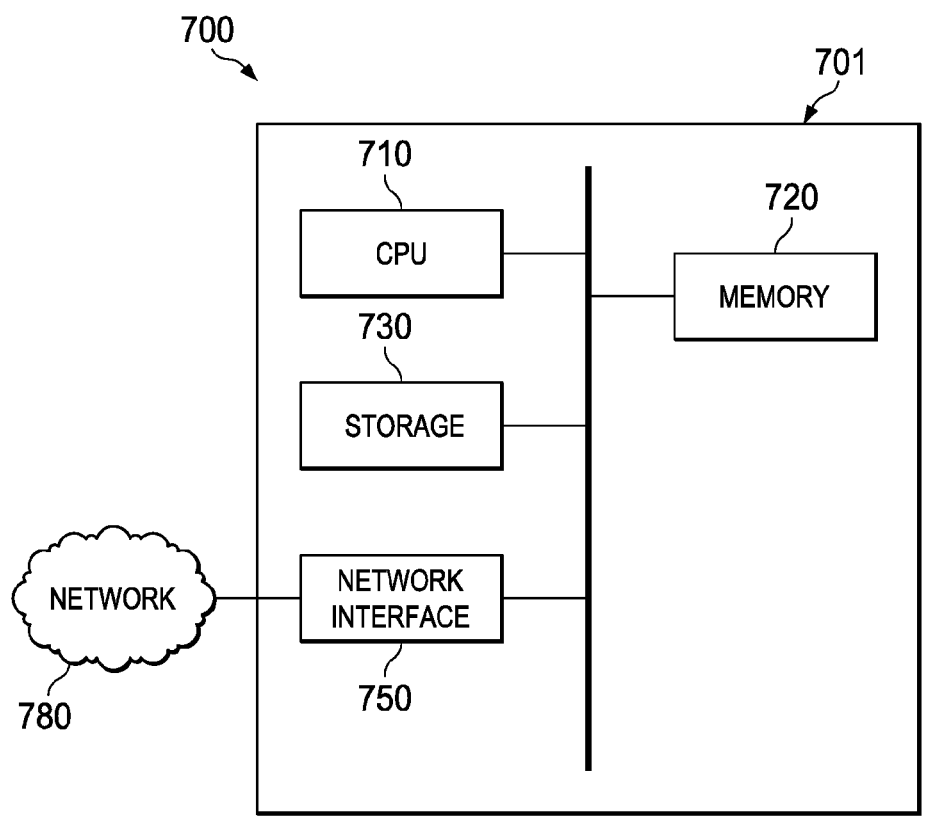
FIG. 7 is a diagram of a processing system that can be used to implement various embodiments.

FIG. 7 is a block diagram of an exemplary processing system 700 that can be used to implement various embodiments. For instance, the system 700 may be part of a network component, such as a base station, a relay, a router, a gateway, or a controller/server unit. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a network interfaces, storage interfaces, and the like. The processing unit 701 may include a central processing unit (CPU) 710, a memory 720, and a storage device 730 connected to a bus. The bus may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. The storage device 730 may comprise any type of storage device configured to store data, programs, and other information and to make the data, programs, and other information accessible via the bus. The storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method increasing band utilization by a network component in a wireless network comprising:
   allocating, at the network component, secondary communications to a guard band, the guard band separating data bands assigned for primary communications using OFDM-based waveform;
   modulating, at the network component, symbols for the secondary communications with a spectrally contained wave form, the spectrally contained wave form having a smaller bandwidth than the guard band, wherein modulating the symbols for the secondary communications with the spectrally contained wave form includes modulating the symbols for the secondary communications in the guard band with filtered orthogonal frequency-division multiplexing (F-OFDM) or with joint orthogonal frequency-division multiplexing (OFDM) and Offset Quadrature Amplitude Modulation (OQAM); and
   transmitting, at the network component, the modulated symbols for the secondary communications within the guard band.

2. The method of claim 1 further comprising transmitting data for the primary communications within the data bands.

3. The method of claim 1, wherein the primary communications and the secondary communications carry independent information.

4. The method of claim 1, wherein the guard band has a smaller bandwidth than the data bands.

5. The method of claim 1, wherein the method further includes synchronizing, at the network component, a timing of at least a portion of the secondary communications with transmissions of another network component, and wherein the transmitting includes transmitting the synchronized secondary communications within the guard band.

6. The method of claim 5, wherein the secondary communications are synchronized according to synchronization signals for the primary communications.

7. The method of claim 5, wherein the secondary communications are synchronized according to synchronization signals for the secondary communications and independent of transmissions of the primary communications.

8. The method of claim 1, wherein the method further includes timing at least a portion of the secondary communications to be asynchronous with transmissions of another network component, and wherein the transmitting includes transmitting the asynchronized secondary communications within the guard band.

9. The method of claim 1, wherein the guard band is shared by the network component and another network component, and wherein a subcarrier shared between the network component and the other network component is reserved in frequency for the guard band.

10. A network component for increasing band utilization in a wireless network, the network component comprising:
   at least one processor; and
   a non-transitory computer readable storage medium storing programming for execution by the processor, the programming including instructions to:
      allocate secondary communications to a guard band, the guard band separating data bands assigned for primary communications using OFDM-based waveform;
      modulate symbols for the secondary communications with a spectrally contained wave form, the spectrally contained wave form having a smaller bandwidth than the guard band, wherein the instructions to modulate the symbols for the secondary communications with the spectrally contained wave form include instructions to modulate the symbols for the secondary communications in the guard band with filtered orthogonal frequency-division multiplexing (F-OFDM) or with joint orthogonal frequency-division multiplexing (OFDM) and Offset Quadrature Amplitude Modulation (OQAM); and
      transmit the modulated symbols for the secondary communications within the guard band.

11. The network component of claim 10, wherein the network component is a user equipment (UE).

12. The network component of claim 10, wherein the secondary communications are machine-to-machine (M2M) system communications.

13. The network component of claim 10, wherein the secondary communications are device-to-device (D2D) communications.

14. The network component of claim 10, wherein the secondary communications are lower power communications relative to the primary communications.

15. A method increasing band utilization by a network component in a wireless network comprising:
   receiving, at the network component, secondary communications within a guard band, the guard band separating data bands assigned for primary communications using OFDM-based waveform; and
   detecting, in the received secondary communications, symbols modulated according to a spectrally contained wave form, the spectrally contained wave form having a smaller bandwidth than the guard band, wherein the detected symbols are filtered OFDM (F-OFDM) symbols or joint orthogonal frequency-division multiplexing (OFDM) and Offset Quadrature Amplitude Modulation (OQAM) symbols.

16. The method of claim 15 further comprising receiving data for the primary communications within the data bands.

17. A network component for increasing band utilization in a wireless network, the network component comprising:
   at least one processor; and
   a non-transitory computer readable storage medium storing programming for execution by the processor, the programming including instructions to:
      receive secondary communications within a guard band, the guard band separating data bands assigned for primary communications using OFDM-based waveform; and
      detect, in the received secondary communications, symbols modulated according to a spectrally contained wave form, the spectrally contained wave form having a smaller bandwidth than the guard band, wherein the detected symbols are filtered orthogonal frequency-division multiplexing (F-OFDM) symbols or joint OFDM and Offset Quadrature Amplitude Modulation (OQAM) symbols.

18. The network component of claim 17, wherein the network component is a base station.

19. The network component of claim 17, wherein the guard band is a dedicated guard band assigned to a user equipment (UE).

20. The network component of claim 17, wherein the guard band is a shared guard band assigned to multiple user equipments (UEs).

* * * * *